United States Patent
El-Hassan et al.

(10) Patent No.: US 11,814,322 B1
(45) Date of Patent: Nov. 14, 2023

(54) METAL-ORGANIC FRAMEWORKS: A PLATFORM FOR REDUCING THE CARBON FOOTPRINT OF CEMENT-BASED COMPOSITES AND THE METHOD FOR MAKING THE SAME

(71) Applicant: United Arab Emirates University, Al Ain (AE)

(72) Inventors: Hilal El-Hassan, Al Ain (AE); Mona El-Hallak, Al Ain (AE); Amr El-Dieb, Al Ain (AE); Ahmed Alzamly, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 18/072,277

(22) Filed: Nov. 30, 2022

(51) Int. Cl.
  *C04B 24/40* (2006.01)
  *C04B 7/02* (2006.01)
  (Continued)

(52) U.S. Cl.
  CPC ............... *C04B 24/405* (2013.01); *C04B 7/02* (2013.01); *C04B 14/28* (2013.01); *C04B 28/04* (2013.01); *C04B 2111/00017* (2013.01)

(58) Field of Classification Search
  CPC ......... C04B 24/405; C04B 7/02; C04B 14/28; C04B 28/04; C04B 2111/00017; C04B 24/40
  See application file for complete search history.

(56) References Cited

U.S. PATENT DOCUMENTS

| | | | |
|---|---|---|---|
| 4,117,060 A | 9/1978 | Murray | |
| 2015/0266010 A1* | 9/2015 | Bazer-Bachi | B01J 37/04 264/234 |
| 2021/0380494 A1 | 12/2021 | Gong | |

FOREIGN PATENT DOCUMENTS

| | | | | |
|---|---|---|---|---|
| CN | 108821690 A | * | 11/2018 | ............. C04B 28/04 |
| CN | 112679749 A | * | 4/2021 | |

OTHER PUBLICATIONS

N Yuan, S Wang, T Chen, X Ma, H Wang, X Zhang, D Wang, Comparative effects of the pristine and amino-functionalized metal—organic frameworks on the mechanical properties and microstructures of cement pastes, Construction and Building Materials, (2022) 347, 128544. DOI:10.1016/j.conbuildmat.2022.128544 (Year: 2022).*

(Continued)

*Primary Examiner* — Bryan D. Ripa
*Assistant Examiner* — Marites A Guino-O Uzzle
(74) *Attorney, Agent, or Firm* — Hayes Soloway PC

(57) ABSTRACT

The invention discloses a method of producing metal-organic framework (MOF) incorporated concrete to capture $CO_2$ and reduce carbon footprint, the method comprising mixing cement, a plurality of fine aggregates and a plurality of coarse aggregates for a predefined time under ambient conditions in a concrete mixer to form a dry concrete mix, mixing water in the dry concrete mix to form a wet concrete mix, incorporating MOF homogeneously into the wet concrete mix to form the MOF incorporated concrete, mixing the MOF incorporated concrete for two minutes and casting the MOF incorporated concrete by placing the MOF incorporated concrete into a mold, and curing the MOF incorporated concrete via a three-stage curing process. A quantity of the MOF in concrete is 3, 6 and/or 9% by cement mass.

14 Claims, 6 Drawing Sheets

(51) Int. Cl.
  C04B 14/28 (2006.01)
  C04B 28/04 (2006.01)
  C04B 111/00 (2006.01)

(56) References Cited

OTHER PUBLICATIONS

Jian Zhang, Shucai Li, Zhaofeng Li, Yifan Gao, Chao Liu, Mechanical strength enhancement and mechanism of hardened cement paste incorporating ZIF-8, Materials Letters, (2020) 268, 127582, DOI:10.1016/j.matlet.2020.127582 (Year: 2020).*

El-Hassan, Hilal. 'Accelerated Carbonation Curing as a Means of Reducing Carbon Dioxide Emissions'. Cement Industry—Optimization, Characterization and Sustainable Application, IntechOpen, Jun. 2021. Crossref, doi:10.5772/intechopen.93929. (Year: 2021).*

CN-108821690-A, machine translation (Year: 2018).*

S Kim, J Kim, H Kim, H Cho, W Ahn, Adsorption/catalytic properties of MIL-125 and NH2-MIL-125, Catalysis Today, 2013, 204, pp. 85-93. DOI: 10.1016/j.cattod.2012.08.014. (Year: 2013).*

A Machner, M Zajac, M Ben Haha, K Kjellsen, M Geiker, K De Weerdt. Stability of the hydrate phase assemblage in Portland composite cements containing dolomite and metakaolin after leaching, carbonation, and chloride exposure. Cem. Con. Comp, 2018, 89, pp. 89-106. DOI:10.1016/j.cemconcomp.2018.02.013. (Year: 2018).*

PCA. Cement Types (2021) [retrieved from the internet at Mar. 3, 2023 from <URL: https://www.cement.org/cement-concrete/concrete-materials/cement-types>]. (Year: 2021).*

PCA. Cement Types wayback machine. Mar. 4, 2021. (Year: 2021).*

A Helmenstine. What is Room Temperature (2020) [retrieved from the internet on Mar. 9, 2023 from <https://sciencenotes.org/what-is-room-temperature/#:~:text=The%20International%20Union%20of%20Pure,%C2%B0F%2C%20298.15%20K).>] (Year: 2020).*

CN-112679749-A, machine translation (Year: 2021).*

* cited by examiner

METAL-ORGANIC FRAMEWORKS: A PLATFORM FOR REDUCING THE CARBON FOOTPRINT OF CEMENT-BASED COMPOSITES AND THE METHOD FOR MAKING THE SAME

FIELD OF THE INVENTION

Embodiments of the present invention relate to the field of concrete production and more particularly to a platform for producing a metal-organic framework (MOF) incorporating cement-based concrete to capture $CO_2$ and reduce carbon footprint and a process thereof.

BACKGROUND OF THE INVENTION

Cement mixes, such as concrete mixes, are used in a multitude of compositions and procedures throughout the world. Currently, concrete is the most commonly used construction material worldwide and its production is estimated to be 11 to 13 million $m^3$ (i.e., based on cement content ranging from 350 to 400 $kg/m^3$) and is expected to reach 15 to 17 million $m^3$ by 2050. Such an excessive need for concrete will have a significant impact on the environment, as the production of concrete and its main binder component, cement, emits a significant number of anthropogenic emissions and emission of a considerable amount of greenhouse gasses.

Over the past few decades, the cement industry has been confronted by effectively reducing $CO_2$ emissions to control its detrimental impact on the environment. Several alternatives have been proposed such as the partial and full replacement of cement by pozzolans and supplementary cementitious materials, such as fly ash (FA), silica fume (SF), and ground granulated blast-furnace slag (GGBFS), among others. Another alternative is the substitution of fossil fuels with a lower-carbon content fuel, like sewage sludge, or utilization of carbon dioxide capture, utilization and storage techniques (CCUS). Despite providing promising results to alleviate the carbon dioxide emissions, the before-mentioned approaches are yet to achieve a carbon-neutral concrete.

One of the most cost-effective ways to curb $CO_2$ emissions associated with global industries is accelerated carbonation of concrete. It is a process of exposing concrete at an early age to $CO_2$ gas under controlled conditions. It involves a chemical reaction between $CO_2$ and main silicate phases in cement, including tricalcium silicate and dicalcium silicate, in the presence of water, to produce calcium silicate hydrate (C—S—H) and calcium carbonate ($CaCO_3$). The accelerated carbonation of concrete is highly dependent on factors that influence the accelerated carbonation process, such as $CO_2$ concentration and pressure, preconditioning conditions, mixture proportions (i.e., sand-to-cement ratio), and type of cementitious material.

U.S. Pat. No. 4,117,060 describes a method and apparatus for the manufacture of products of concrete or like construction, in which a mixture of calcareous cementitious binder substance, such as cement, an aggregate, a vinyl acetate-dibutyl maleate copolymer, and an amount of water sufficient to make a relatively dry mix is compressed into the desired configuration in a mold, and with the mixture being exposed to carbon dioxide gas in the mold, prior to the compression taking place, such that the carbon dioxide gas reacts with the ingredients to provide a hardened product in an accelerated state of cure having excellent physical properties. U.S. Ser. No. 17/404,861 describes a ready-mixed composition and a premix composition to produce a concrete material containing sequestered carbon dioxide, a $CO_2$-containing water used in such compositions, dry-batch and wet-batch processes for sequestering carbon dioxide in concrete material, and general method and process for sequestering carbon dioxide in hardening concrete.

Metal-organic framework (MOF) have emerged as an excellent adsorbent material to be employed in capturing $CO_2$. Yet, despite their attractive characteristics and features, their utilization has been limited to certain applications and is yet to be used by several major industries, including the construction industry. They are synthesized using metal-based nodes (single ions or clusters) bridged by organic linking groups to form one, two, or three-dimensional coordination networks.

However, there is a need to develop a new approach to overcome the shortcomings of methods and compositions to contact cement mixes with carbon dioxide and for cement mixes containing incorporated carbon dioxide and carbonation products.

SUMMARY OF THE INVENTION

Aspects of the disclosed embodiments seek to provide a platform for producing a metal-organic framework (MOF) incorporating cement-based concrete to capture $CO_2$ and reduce carbon footprint and a process thereof.

Embodiments of the present invention relates to process for producing a metal-organic framework (MOF) incorporating cement-based concrete to capture $CO_2$ and reduce carbon footprint comprising steps of mixing cement, a plurality of fine aggregates and a plurality of coarse aggregates for predefined time of 3 minutes under ambient conditions in a concrete mixer to form a dry concrete mix, mixing water for predefined time of two minutes in the dry concrete mix to form a wet concrete mix, incorporating the metal-organic framework (MOF) homogeneously into the wet concrete mix to form the metal-organic framework (MOF) incorporated cement-based concrete, mixing the metal-organic framework (MOF) incorporated cement-based concrete for two minutes, casting the metal-organic framework (MOF) incorporated cement-based concrete by placing the fresh metal-organic framework (MOF) incorporated cement-based concrete into a mold and curing the metal-organic framework (MOF) incorporated cement-based concrete. In particular, the metal-organic framework (MOF) incorporating cement-based concrete are configured to have better compressive strength, resistance to water absorption, mechanical properties, and durability properties.

In accordance with an embodiment of the present invention, the cement is an ASTM Type I ordinary Portland cement (OPC). And the plurality of fine aggregates and the plurality of coarse aggregates are dolomitic limestone aggregates.

In accordance with an embodiment of the present invention, the process of producing the metal-organic frameworks (MOF) incorporated cement-based concrete is an accelerated carbonation curing process. In particular, the accelerated carbonation curing process depends on a plurality of factors including quantity of MOF, initial air curing duration, accelerated carbonation curing duration, and carbonation pressure.

In accordance with an embodiment of the present invention, the metal-organic framework (MOF) is $NH_2$-MIL-125. In particular, the metal-organic framework (MOF) has $CO_2$ adsorption capacity of 136 mg/g and a high Brunauer, Emmett, and Teller (BET) surface area of 1530 $m^2/g$.

Moreover, the metal-organic framework (MOF) is configured to increase the $CO_2$ uptake and degree of carbonation depth of cement-based concrete. Further, the degree of carbonation in MOF-incorporating cement-based concrete increases with longer initial curing durations at higher pressure.

In accordance with an embodiment of the present invention, the metal-organic frameworks (MOF) quantity is 3% or 6%, or 9%, by cement mass.

Another embodiment of the present invention, a Platform for production of metal-organic frameworks (MOF) incorporating cement-based concrete to capture and offset $CO_2$ emissions generated during production of cement.

In accordance with an embodiment of the present invention, the prolonging initial curing for MOF-incorporating cement-based concrete has a prominent impact on the $CO_2$ uptake and average carbonation depth.

The carbonating MOF-incorporating cement-based concrete at higher pressure increases the degree of carbonation reaction, the $CO_2$ uptake, and the average carbonation depth. In particular, the carbonation degree of cement in MOF-incorporating cement-based concrete is more pronounced with longer initial curing durations and at higher pressure.

In accordance with an embodiment of the present invention, the incorporation of MOF causes a decrease in water absorption and permeable pore voids volume.

In another embodiment of the present invention, a metal-organic framework (MOF) incorporated concrete composition is proposed comprising cement, a plurality of fine aggregates and a plurality of coarse aggregates, and water forming a wet concrete mix, wherein metal-organic framework (MOF) is homogeneously incorporated into the wet concrete mix to form the metal-organic framework (MOF) incorporated concrete composition.

Additional aspects of the invention will be set forth in part in the description which follows, and in part will be obvious from the description, or may be learned by practice of the invention.

BRIEF DESCRIPTION OF THE DRAWINGS

The manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The foregoing and other objects, features and advantages of the present invention, as well as the invention itself, will be more fully understood from the following description of preferred embodiments, when read together with the accompanying drawings.

DETAILED DESCRIPTION OF THE DRAWINGS

The present invention relates to producing a metal-organic framework (MOF) incorporating cement-based concrete to capture $CO_2$ and reduce carbon footprint and a process thereof. The principles of the present invention and their advantages are best understood by referring to FIG. 1 to FIG. 8B. In the following detailed description of illustrative or exemplary embodiments of the disclosure, specific embodiments in which the disclosure may be practiced are described in sufficient detail to enable those skilled in the art to practice the disclosed embodiments.

The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Three primary technologies have been utilized for capturing $CO_2$ using MOF, namely, pre-combustion, post-combustion, and oxy-fuel combustion. The selection of the technology is mainly based on its $CO_2$ feed input conditions, advantages, and disadvantages. Based on their $CO_2$-capturing capabilities, the use of MOF as a main component in concrete production could alleviate the environmental impact of $CO_2$ emissions associated with the manufacture of cement. The present invention focuses on providing a sustainable and eco-friendly concrete by incorporating MOF in cement-based concrete to capture $CO_2$ and offset the carbon footprint associated with the manufacture of cement and curing the MOF-embedded concrete using an accelerated carbonation regime.

SEM or scanning electron microscope can be used interchangeably throughout the present invention for convenience. EDX or Energy-dispersive X-ray spectroscopy can be used interchangeably throughout the present invention for convenience. MOF or metal-organic framework can be used interchangeably throughout the present invention for convenience.

Simultaneously referring to FIG. 1 to FIG. 8B, the various embodiments of the metal-organic framework (MOF) incorporating cement-based concrete are elaborated below.

Figure 1:
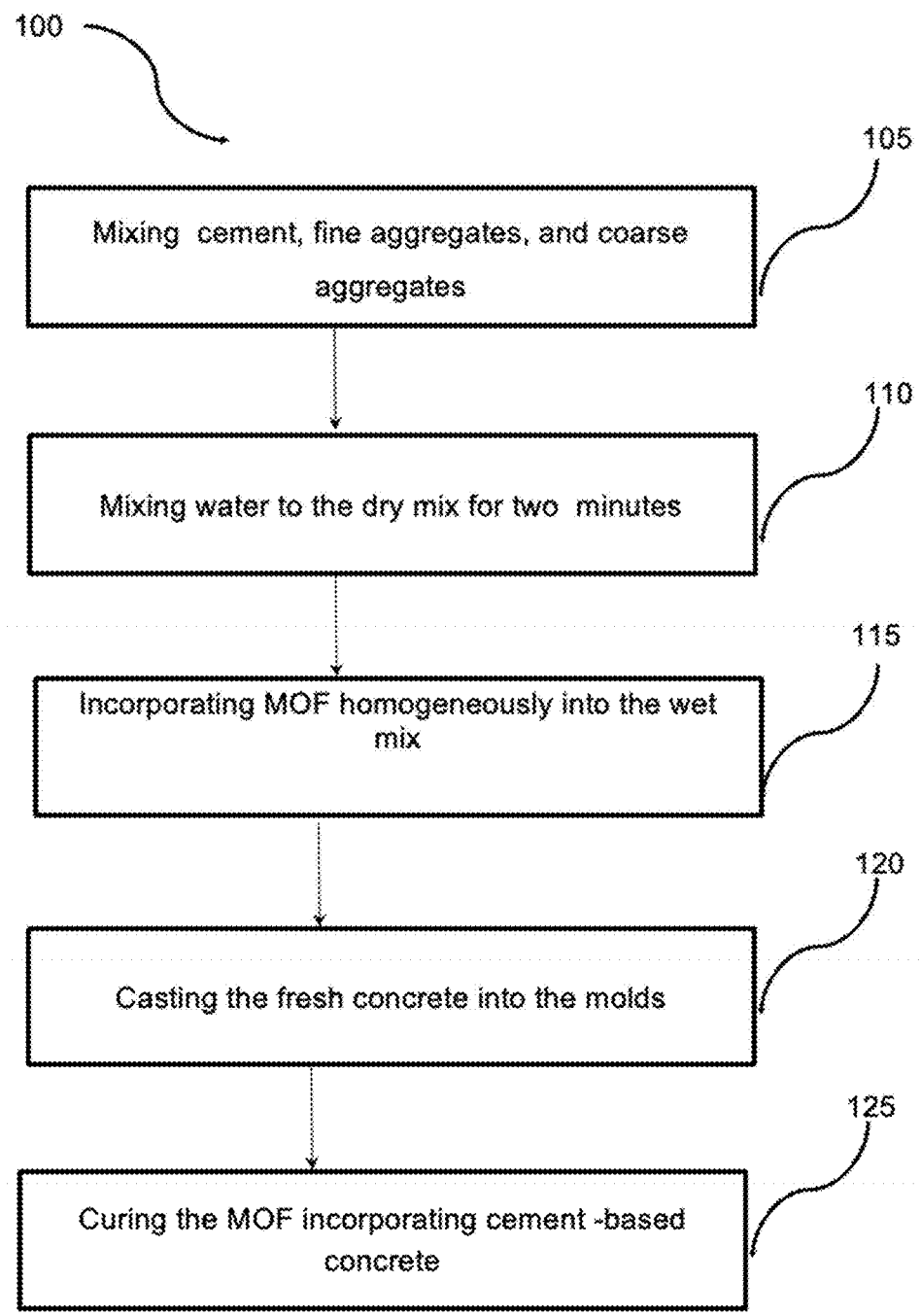
FIG. 1 is a flowchart illustrating a process of producing a metal-organic framework (MOF) incorporating cement-based concrete for capturing and offsetting $CO_2$ emissions generated to reduce carbon footprint in accordance with one or more embodiments of the present invention.

FIG. 1 is a flowchart illustrating a process of producing a metal-organic framework (MOF) incorporated cement-based concrete for capturing and offsetting $CO_2$ emissions generated during the production thereby reducing carbon footprint. The process is in accordance with ASTM C192 for making and curing concrete test specimens. The process starts at step 105 and proceeds to step 110, 115, 120. At step 105, cement, fine aggregates and coarse aggregates are mixed for a predefined time of 3 minutes under ambient conditions in a concrete mixer to form a dry concrete mix. In particular, the cement is ASTM Type I ordinary Portland cement (OPC). Moreover, the fine aggregates and coarse aggregates are crushed dolomitic limestone aggregates. At step 110, the water (tap water) is mixed with the dry concrete mix for a predefined time of two minutes to form a wet concrete mix.

At step 115, the metal-organic framework (MOF) homogeneously is incorporated into the wet concrete mix to form the metal-organic framework (MOF) incorporated cement-based concrete. In particular, the metal-organic framework is $NH_2$-MIL-125. Moreover, the metal-organic framework acts as $CO_2$ adsorbent when incorporated into the concrete mixes. Further, it has high $CO_2$ adsorption capacity (136 mg/g) and high Brunauer, Emmett, and Teller (BET) surface area of 1530 $m^2$/g. Further, the metal-organic framework (MOF) is configured to increase the $CO_2$ uptake and degree of carbonation depth of cement-based concrete. Subsequently, the degree of carbonation in MOF-incorporating cement-based concrete increases with longer initial curing durations at higher pressure.

In various embodiments of the present invention, the metal-organic framework (MOF) quantity is 3% or 6% or 9%, by cement mass.

At step 120, the metal-organic framework (MOF) incorporated cement-based concrete are cast by placing the fresh metal-organic framework (MOF) incorporated cement-based concrete into a mold. The mold can be of any shape and size depending on the requirements. At step 125, the metal-organic framework (MOF) incorporated cement-based concrete are cured after demolding. Curing is divided into three stages: pre-carbonation curing (i.e., initial air curing), accelerated carbonation curing, and post-carbonation curing (i.e., subsequent hydration). In the pre-carbonation (initial) air curing scheme, the specimens were subjected to open-air curing. The concrete mix is air-cured in the laboratory at ambient conditions of 50±5% relative humidity (RH) and a temperature of 25±2° C. until testing age.

In accordance with one or more embodiments of the present invention, the process of producing the metal-organic framework (MOF) incorporated cement-based concrete is an accelerated carbonation curing process. In particular, the accelerated carbonation curing process depends on a plurality of factors such as but not limited to quantity of MOF, initial air curing duration, accelerated carbonation curing duration, and carbonation pressure. In accordance with one or more embodiment of the present invention, the cement concrete mixes may be designated as Xa-Yc-ZP-WM, where X—Initial air curing duration in hours,
Y—Accelerated carbonation curing duration in hours,
Z—Carbonation pressure inside the chamber in bars, and
W—Quantity of MOF incorporated into the mix as a percentage of binder mass.

Table 1 below illustrates a tabular representation of the experimental test matrix to observe the effect of each parameter. A total of 11 cement-based concrete mixes are designed and cast. For each group, a control carbonated mix without the addition of MOF is compared to carbonated metal-organic framework (MOF) incorporating cement-based concrete mixes.

TABLE 1

Experimental test matrix

| Group | Mix ID | Mix designation | Initial air curing duration (h) 4 | 20 | Accelerated carbonation duration (h) 4 | 20 | $CO_2$ pressure (bar) 1 | 5 | Quantity of MOF (%) 0 | 3 | 6 | 9 |
|---|---|---|---|---|---|---|---|---|---|---|---|---|
| Control | C0 | 0a+0c-0P-0M | | | | | | | x | | | |
| A | C1 | 20a+4c-1P-0M | | x | x | | x | | x | | | |
| | M1-1 | 20a+4c-1P-3M | | x | x | | x | | | x | | |
| | M1-2 | 20a+4c-1P-6M | | x | x | | x | | | | x | |
| | M1-3 | 20a+4c-1P-9M | | x | x | | x | | | | | x |
| B | C2 | 4a+4c-1P-0M | x | | x | | x | | x | | | |
| | M2 | 4a+4c-1P-6M | x | | x | | x | | | | x | |
| C | C3 | 20a+20c-1P-0M | | x | | x | x | | x | | | |
| | M3 | 20a+20c-1P-6M | | x | | x | x | | | | x | |
| D | C4 | 20a+4c-5P-0M | | x | x | | | x | x | | | |
| | M4 | 20a+4c-5P-6M | | x | x | | | x | | | x | |

Table 1 also shows five groups of mixes. Control group (0a+0c-0P-0M), a non-carbonated cement-based concrete benchmark mix placed in a sealed plastic bag after demolding without any initial curing or carbonation curing, or MOF. Group A has four concrete mixes with one mix having no MOF and the other three having 3, 6, and 9% MOF addition, by binder mass respectively. All four concrete mixes (i.e., 20a+4c-1P-0M, 20a+4c-1P-3M, 20a+4c-1P-6M, and 20a+4c-1P-9M) are subjected to 20 hours of air curing followed by 4 hours of carbonation to examine the effect of MOF quantity. The mix M1-3 (20a+4c-1P-9M) entails a mix made with 9% MOF, by cement mass subjected to 20 hours of initial air curing and 4 hours of carbonation curing at a pressure of 1 bar.

Group B includes one mix without MOF and the other having 6% MOF by binder mass to observe the effect of shorter initial curing duration and 4-hour carbonation curing. The result shows that exceeding 6% MOF content did not improve carbon uptake or performance. Group C includes two mixes (one with MOF and one without MOF) to evaluate the influence of prolonged initial curing and carbonation curing durations for 20 hours. Group D includes one mix incorporated with 6% MOF and another with no MOF to examine the impact of carbonating concrete at a higher pressure of 5 bars.

Figure 2:
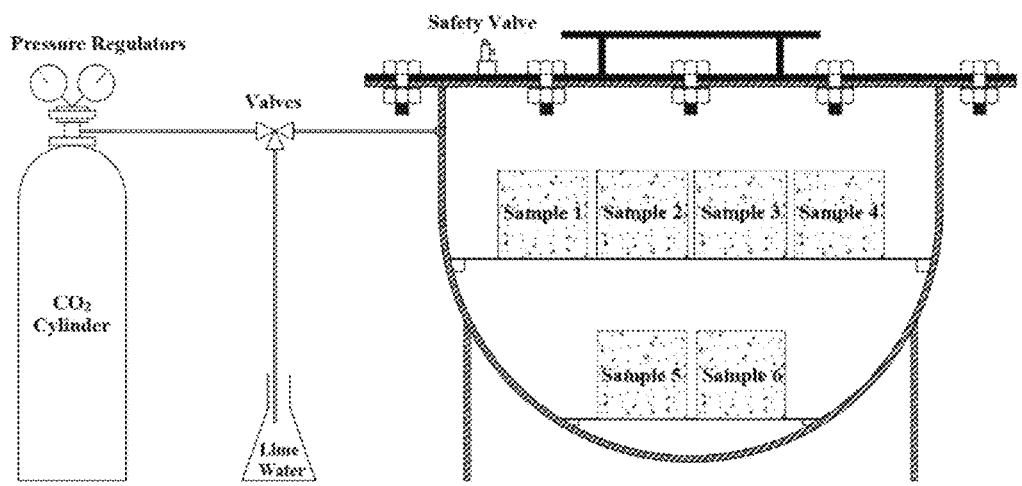
FIG. 2 is a schematic diagram illustrating carbonation setup in accordance with an embodiment of the present invention.

FIG. 2 is a schematic diagram of carbonation setup in accordance with an embodiment of the present invention. The carbonation setup includes sealable carbonation chamber (105) with safety valve (107), a $CO_2$ cylinder (110), pressure regulators (120), and series of valves (115). In particular, the accelerated carbonation curing process is performed in the sealable carbonation chamber (105). Moreover, the carbonation chamber (105) is attached to a $CO_2$ cylinder (110) with a purity of 99.5%. Further, the pressure is monitored and regulated using two pressure regulators (120). Additionally, a series of valves (115) allows the $CO_2$ to pass from the $CO_2$ cylinder (110) into the carbonation chamber (105) and from the carbonation chamber (105) into the limewater (125).

In accordance with an embodiment of the present invention, after an accelerated carbonation curing process, the concrete mixes undergo two post-carbonation curing processes. The first post-carbonation curing process the concrete mixed cubes are kept in a sealed plastic bag till the testing age for sealed subsequent hydration. In the second post-carbonation curing process compensation of water lost during the initial curing and carbonation curing is observed to see the impact on subsequent hydration until the age of 28 days. In particular, water is sprayed onto the concrete mixes until saturation every day for the first 7 days and every alternate day until 28 days. After each spraying step, the concrete mixes are placed in a sealed plastic bag. And, the process is repeated until testing age.

In accordance with an embodiment of the present invention, the mechanical properties and durability performance of the concrete mixes are assessed by means of the carbon uptake, carbonation depth, compressive strength, water absorption and permeable pore voids volume. In particular, the mass gain method is used to quantify the $CO_2$ uptake of carbonated samples. The $CO_2$ uptake is estimated by comparing the mass of the specimens before and after carbonation taking into consideration that the carbonation process was a closed system:

$$CO_2 \text{ uptake } (\%) = \frac{\text{Final mass} + \text{Water mass} - \text{Initial mass}}{\text{Cement mass}} \times 100\%$$

The cube compressive strength of concrete mixes to assess the mechanical performance of the metal-organic framework (MOF) incorporating cement-based concrete is evaluated in accordance with BS EN-12390-3 on day 1, 7, and 28. Moreover, water absorption and permeable pore voids volume of concrete mixes to investigate the durability of the metal-organic framework (MOF) incorporating cement-based concrete is evaluated as per the procedure of ASTM C642 on day 1 and 28.

Figure 3:
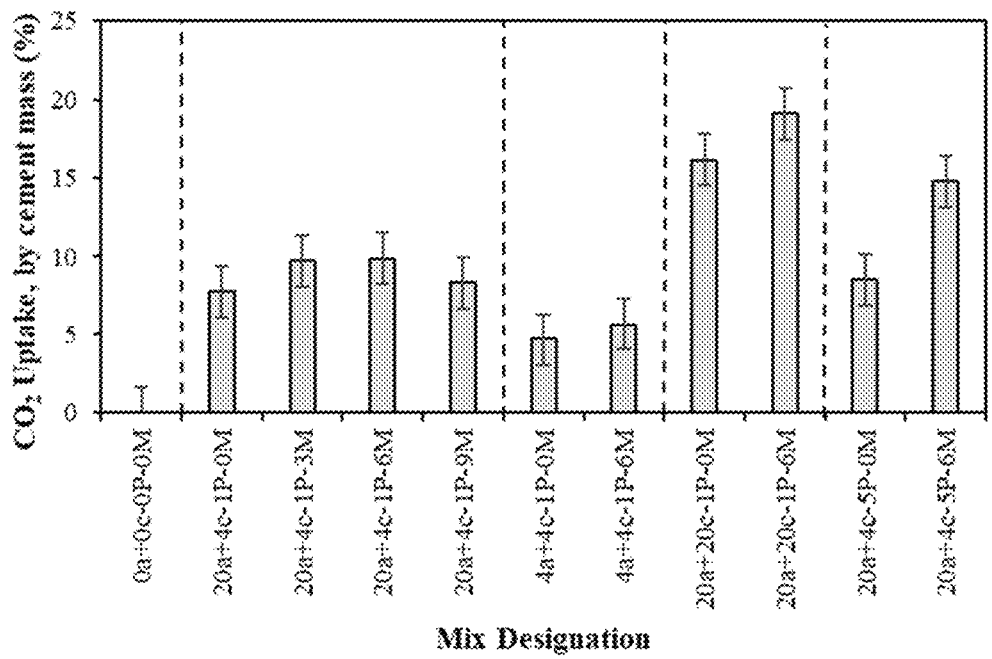
FIG. 3 is a graphical representation illustrating $CO_2$ uptake by concrete cement mixes in accordance with an embodiment of the present invention.

FIG. 3 is a graphical representation illustrating $CO_2$ uptake by all 11 concrete cement mixes (control, group A, group B, group C and group D) obtained by the mass gain method. Different percentages of MOF (0, 3, 6, and 9%, by cement mass) are incorporated into the concrete to examine the effect of the quantity of MOF on the $CO_2$ uptake. In particular, increasing the MOF percentage from 0 to 3 and 6%, by cement mass, led to an increase in the $CO_2$ uptake from 7.77 to 9.74 and 9.88%, respectively, representing respective 25 and 27% improvements in the carbonation efficiency. And, on increasing the quantity of MOF to 9%, by cement mass, the uptake is decreased to 8.34%. This may be caused by agglomeration of the MOF particles inside the concrete and reducing the $CO_2$ adsorption sites and decreasing the uptake.

In an embodiment, the MOF adsorbs $CO_2$ gas and increases the $CO_2$ uptake of the concrete matrix. In particular, by adding 6% MOF to groups B, C, and D the $CO_2$ uptake is increased by 20, 18, and 73%, respectively. Table 2 is a tabular representation illustrating carbonation reaction efficiency of MOF of carbonated concrete mixes. In particular, for concrete mixes without MOF, the total $CO_2$ uptake is attributed to the cement only and is the same as the cement $CO_2$ uptake in these mixes. While, for mixes with MOF, the cement $CO_2$ uptake is the same as those without MOF for each mix group. For instance, the cement $CO_2$ uptake of mix C1 (20a+4c-1P-0M) and M1-2 (20a+4c-1P-6M) is 7.77%.

TABLE 2

Carbonation reaction measurements of concrete mixes

| Mix ID | Mix designation | Total $CO_2$ uptake (%) | Cement $CO_2$ uptake (%) | MOF $CO_2$ uptake (%) | MOF $CO_2$ mass (kg/m³) | Reaction efficiency (mg/g) | Corrected cement $CO_2$ uptake (%) |
|---|---|---|---|---|---|---|---|
| C1 | 20a+4c–1P–0M | 7.77 ± 0.3 | 7.77 | — | — | — | — |
| M1-1 | 20a+4c–1P–3M | 9.74 ± 0.1 | 7.77 | 1.97 | 6.69 | 655.88 | 9.33 |
| M1-2 | 20a+4c–1P–6M | 9.88 ± 0.2 | 7.77 | 2.11 | 7.17 | 351.47 | 9.06 |
| M1-3 | 20a+4c–1P–9M | 8.34 ± 0.3 | 7.77 | 0.57 | 1.94 | 63.40 | — |
| C2 | 4a+4c–1P–0M | 4.70 ± 0.1 | 4.70 | — | — | — | — |
| M2 | 4a+4c–1P–6M | 5.66 ± 0.1 | 4.70 | 0.96 | 3.26 | 159.80 | 4.84 |
| C3 | 20a+20c–1P–0M | 16.14 ± 0.6 | 16.14 | — | — | — | — |
| M3 | 20a+20c–1P–6M | 19.09 ± 0.7 | 16.14 | 2.95 | 10.03 | 491.67 | 18.27 |
| C4 | 20a+4c–5P–0M | 8.53 ± 0.3 | 8.53 | — | — | — | — |
| M4 | 20a+4c–5P–6M | 14.78 ± 0.7 | 8.53 | 6.25 | 21.25 | 1041.67 | 13.96 |

From Table 2, it can be inferred that the highest MOF reaction efficiency was that of mix M4 (20a+4c-5P-6M) with a value of 1041.67 mg/g, followed by mixes M1-1 (20a+4c-1P-3M) and M3 (20a+20c-1P-6M) with respective efficiencies of 655.88 and 491.67 mg/g. Furthermore, a comparison between mixes M1-1 (20a+4c-1P-3M) and M1-2 (20a+4c-1P-6M) shows that the former had a lower uptake but higher reaction efficiency than the latter. Apparently, adding two times more $NH_2$-MIL-125 in the latter (M1-2) reduced the reaction efficiency, owing to possible agglomeration of the $NH_2$-MIL-125 particles. In fact, if the efficiency was unaffected by the total mass of $NH_2$-MIL-125 added to the mix, the total $CO_2$ uptake would have reached 11.71%.

In particular, the MOF is placed in the $CO_2$ chamber at a temperature of 25° C. and RH of 50% for up to 4 days. The $CO_2$ uptake did not exceed 12.5%, by MOF mass, or a reaction efficiency of 125 mg/g. Since the MOF has a specific adsorption capacity based on its chemical and physical properties, the excess $CO_2$ is captured by the cement. For this reason, a corrected cement $CO_2$ uptake is calculated (column 8 in Table 2). Using the actual reaction efficiency of the MOF, the $CO_2$ adsorption capacity of the MOF reaches up to 136 mg/g. The $CO_2$ uptake of the MOF is calculated as a function of the mass of cement and subtracted from the total $CO_2$ uptake to calculate the corrected cement $CO_2$ uptake. The corrected cement $CO_2$ uptake is higher than the originally considered cement $CO_2$ uptake, assumed to be equal to that of mixes without the MOF from the same group, by up to 64%.

Figure 4:
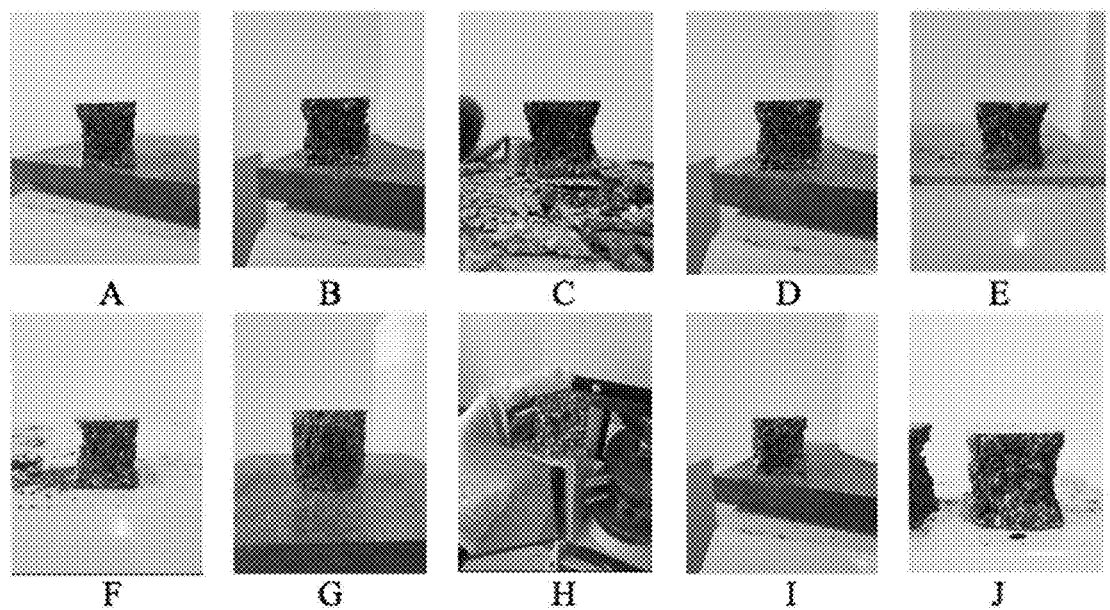
FIG. 4 illustrates pictorial snapshots of the carbonated and uncarbonated regions of the concrete mixes in accordance with one or more embodiments of the present invention.

FIG. 4 illustrates pictorial snapshots of the carbonated and uncarbonated regions of the concrete mixes in accordance with one or more embodiments of the present invention. The samples A: C1, B: M1-1, C: M1-2, D: M1-3, E: C2, F: M2, G: C3, H: M3, I: C4, J: M4 are sprayed with phenolphthalein indicator solution. Phenolphthalein solution is used to assess the average carbonation depth and identify the carbonated and non-carbonated regions of the carbonated and hydrated samples. When, the phenolphthalein solution sprayed on the freshly cut surfaces of the 28-day specimens of the concrete mixes, the phenolphthalein solution turned into a pink or magenta for the more basic regions with a pH of more than 9 and remained colorless for less basic regions with a pH less than 9 signifying the progress of the carbonation reaction. Further, the pink or magenta color region represented non-carbonated concrete mixes and colorless region represented for the carbonated concrete mixes. Table 3 below is a tabular representation illustrating an average carbonation depth of different concrete mixes:

TABLE 3

Average carbonation depths of concrete mixes at 28 days

| | Mix ID | Mix designation | Total $CO_2$ uptake (%) | Average carbonation depth (mm) |
|---|---|---|---|---|
| Group A | C1 | 20a+4c-1P-0M | 7.77 ± 0.3 | 4.9 ± 0.2 |
| | M1-1 | 20a+4c-1P-3M | 9.74 ± 0.1 | 6.6 ± 1.1 |
| | M1-2 | 20a+4c-1P-6M | 9.88 ± 0.2 | 6.8 ± 1.0 |
| | M1-3 | 20a+4c-1P-9M | 8.34 ± 0.3 | 5.3 ± 0.8 |
| Group B | C2 | 4a+4c-1P-0M | 4.70 ± 0.1 | 4.3 ± 0.7 |
| | M2 | 4a+4c-1P-6M | 5.66 ± 0.1 | 4.6 ± 0.8 |
| Group C | C3 | 20a+20c-1P-0M | 16.14 ± 0.6 | 9.8 ± 1.2 |
| | M3 | 20a+20c-1P-6M | 19.09 ± 0.7 | 11.6 ± 1.3 |
| Group D | C4 | 20a+4c-5P-0M | 8.53 ± 0.3 | 5.9 ± 1.0 |
| | M4 | 20a+4c-5P-6M | 14.78 ± 0.7 | 9.3 ± 1.2 |

From Table 3 it can be inferred that MOF incorporation in concrete mixes have increased the average carbonation depth and $CO_2$ uptake. Further, on adding the MOF at 3, 6, and 9%, by cement mass, in group A (M1-1, M1-2 and M1-3), the depth increased by 35, 39, and 8%, respectively. The inclusion of 6% MOF, by cement mass, in groups B, C, and D resulted in a 7, 18, and 58% increase in the depth of carbonation. In accordance with an embodiment of the present invention, the concrete mixes without MOF such as 4a+4c-1P-0M and 20a+4c-1P-0M show an increase of 14% in carbonation depth, from 4.3 to 4.9 mm, upon extending the initial curing duration to 20 hours with an increase of 65% in $CO_2$ uptake. The concrete mixes incorporating MOF (i.e., 4a+4c-1P-6M and 20a+4c-1P-6M) show 48% increase in depth, corresponding to a 75% increase in $CO_2$ uptake.

In accordance with another embodiment of the present invention, considering the concrete mixes without MOF (20a+4c-1P-0M and 20a+20c-1P-0M) there is an increase in the carbonation depth from 4.9 to 9.8 mm (100% increase) and a 108% increase in $CO_2$ uptake upon extending the carbonation curing duration from 4 to 20 hours. The concrete mix incorporating MOF led to an increase of 71% in carbonation depth, from 6.8 to 11.6 mm, with an increase of 93% in uptake. Further, the concrete mixes made without MOF have depth reached 5.9 mm, with respective increases in carbonation depth and $CO_2$ uptake of 20 and 10%. Increasing the pressure to 5 bars in mix M4 (20a+4c-5P-6M) caused corresponding carbonation depth and $CO_2$ uptake increases of 37 and 50%.

Figure 5:
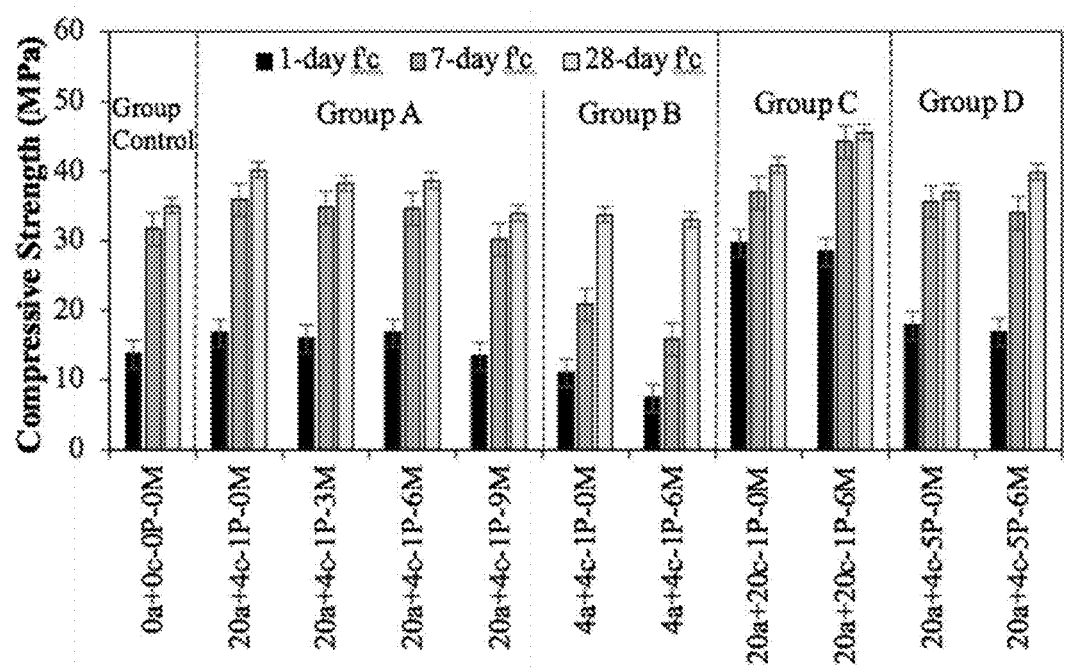
FIG. 5 is a graphical representation illustrating a compressive strength of the concrete mixes on day 1, 7 and 28 in accordance with an embodiment of the present invention.

FIG. 5 is a graphical representation illustrating the compressive strength of the concrete mixes on day 1, 7 and 28 in accordance with an embodiment of the present invention. In particular, the concrete mixes without MOF showed an improved compressive strength upon accelerated carbonation curing in comparison with that of the hydrated control mix. Moreover, the largest improvements are recorded on day 1 reaching up to 30%. In accordance with an embodiment of the present invention, the accelerated hydration carbonation process converts calcium silicates in the non-hydrated cement into calcium silicate hydrate and calcium carbonate. The formation of the carbonation products led to a reduction in the porosity by filling the pores in the cement matrix and enhancing the compressive strength. Table 4 is a tabular representation illustrating the strength gain profile of concrete mixes:

TABLE 4

Strength gain of concrete over time

| Mix ID | Mix Designation | Compressive Strength (MPa) 1-day | 7-day | 28-day | Strength Gain (%) 1 to 7 | 7 to 28 |
|---|---|---|---|---|---|---|
| C0 | 0a+0c-0P-0M | 13.8 | 31.7 | 35.1 | 130.1 | 10.7 |
| C1 | 20a+4c-1P-0M | 16.8 | 35.9 | 40.2 | 113.8 | 12.0 |
| M1-1 | 20a+4c-1P-3M | 16.0 | 34.8 | 38.3 | 118.0 | 10.1 |
| M1-2 | 20a+4c-1P-6M | 16.8 | 34.6 | 38.7 | 106.0 | 11.8 |
| M1-3 | 20a+4c-1P-9M | 13.5 | 30.2 | 34.0 | 123.6 | 12.5 |
| C2 | 4a+4c-1P-0M | 11.1 | 20.9 | 33.8 | 88.0 | 61.7 |
| M2 | 4a+4c-1P-6M | 7.5 | 15.9 | 33.1 | 112.3 | 108.6 |
| C3 | 20a+20c-1P-0M | 29.7* | 36.9 | 40.9 | 24.2 | 11.0 |
| M3 | 20a+20c-1P-6M | 28.4* | 44.2 | 45.6 | 55.9 | 3.1 |
| C4 | 20a+4c-5P-0M | 17.9 | 35.6 | 37.1 | 99.6 | 4.0 |
| M4 | 20a+4c-5P-6M | 16.9 | 34.0 | 39.9 | 101.2 | 17.2 |

*2-day compressive strength

In particular, the mixes made without MOF, the hydrated control C0 has the highest strength gain up to 7 days, and the lowest is for mix 20a+20c-1P-0M. Subsequently, the strength development associated with the hydration reaction in C0 progressed rapidly within the first 7 days, after which it decelerated until 28 days. The mix 20a+20c-1P-0M is tested at the age of 2 days with 20-hour initial curing and 20 hours of carbonation curing. In this mix, nearly 73% of the 28-day strength is attained at the age of 2 days induced by 20-hour prolonged carbonation curing. This resulted in the lowest strength gain up to 7 days. The MOF-incorporating concrete mixes have superior strength gain from 1 to 7 days compared to counterparts mixes without MOF, except for mix M1-2. And, among the MOF-incorporating concrete mixes the lowest strength mix on day 1 had the highest gain over the first 7 days indicating that the inclusion of MOF in concrete does not hinder the hydration reaction.

Further, it is seen from Table 4 that on day 7 and 28 compressive strengths, mixes made without MOF were up to 16 and 17% higher than the hydrated control mix C0. The MOF incorporating concrete mixes have varying 1-day strengths ranging between 46% lower to 16% higher than that of the hydrated control mix. The variation reduces with age and 7- and 28-day strengths are 5% less to 30% more than those of mix C0. Thus, addition of MOF affects the early-age compressive strength for mixes with short initial curing duration of 4 hours and high MOF content of 9%.

In accordance with an embodiment of the present invention, the effect of MOF quantity on the compressive strength is investigated using the Group A concrete mixes (20a+4c-1P-0M, 20a+4c-1P-3M, 20a+4c-1P-6M, and 20a+4c-1P-9M). The strength values of MOF incorporating concrete mixes on day 1 are 16.0, 16.8, and 13.5 MPa. The impact of incorporating MOF is apparent with a content of 9%, by cement mass. It seems that the agglomeration of MOF in the concrete may have not only affected the carbonation reaction efficiency, i.e. carbon uptake capacity, but also the early-age compressive strength. The effect of MOF inclusion on the day 28, the compressive strength of concrete is compared with the two mixes within groups B, C, and D. The addition of 6% metal-organic framework by cement mass, in group B mixes (4a+4c-1P-0M and 4a+4c-1P-6M) resulted in an insignificant decrease in strength (2%), while in groups C and D, the strength increased by 11 and 8%, respectively. The MOF added enhances the carbon uptake capacity of concrete mixes while either improving or not significantly affecting the concrete mechanical performance.

In accordance with an embodiment of the present invention, the four concrete mixes C2 (4a+4c-1P-0M), C1 (20a+4c-1P-0M), M2 (4a+4c-1P-6M), and M1-2 (20a+4c-1P-6M) are considered to evaluate the effect of initial curing on the degree of carbonation reaction. In particular, the concrete mixes are carbonated under a constant pressure of 1 bar and for a duration of 4 hours. For, the first two mixes without the MOF (i.e., 4a+4c-1P-0M and 20a+4c-1P-0M), extending initial curing duration from 4 to 20 hours increases the $CO_2$ uptake from 4.70 to 7.77%, representing an increase of 65%. And, for MOF incorporating concrete mixes (i.e., 4a+4c-1P-6M and 20a+4c-1P-6M), the $CO_2$ uptake increased by 75%, from 5.66 to 9.88%. Thus, the prolonged initial curing has a more prominent impact on the degree of carbonation reaction for the MOF incorporating concrete mixes.

Further, by increasing the initial curing duration to 20 hours the excess free water from the concrete and MOF is driven out creating voids which facilitate the diffusion of the $CO_2$ gas into the concrete mix. Consequently, the diffused $CO_2$ reacts with the cement and is adsorbed by the MOF, achieving a higher carbonation degree. Furthermore, the addition of the MOF may promote the carbonation of cement and increase $CO_2$ uptake. As shown in Table 2, after correction, the cement $CO_2$ uptake increased from 4.70 to 4.84% (corrected) and 7.77 to 9.06% (corrected) for mixes C1 (4a+4c-1P-6M) and M1-2 (20a+4c-1P-6M), representing increases of 3 and 17%, respectively signifying the increase in the carbonation of cement (i.e., cement $CO_2$ uptake) due to the addition of MOF with longer initial curing durations.

In accordance with an embodiment of the present invention, the concrete mixes are cured for 20 hours of air curing followed by carbonation at a pressure of 1 bar. For mixes without MOF, increasing the carbonation duration from 4 to 20 hours also increases the $CO_2$ uptake from 7.77 to 16.14%, signifying an increase of 108%. A longer carbonation period of concrete mixes incorporating 6% of the MOF enhanced the $CO_2$ uptake by 93%, from 9.88 to 19.09%. Moreover, extending the carbonation duration prolonged cement exposure to $CO_2$ gas and consequently promotes higher carbon uptake. Furthermore, the inclusion of the MOF in carbonation-cured concrete improves the carbonation reactivity of cement by up to 17%.

In accordance with another embodiment of the present invention, concrete mixes made without MOF and carbonated at pressures of 1 and 5 bars had carbon uptakes of 7.77 and 8.53%. The increase in pressure led to a 10% increase in uptake. And, increasing the pressure while carbonating MOF-incorporating concrete mixes led to carbon uptakes of 9.88% and 14.78%, representing an increase of 50%. Further, higher pressure promotes a higher degree of carbonation allowing deeper penetration and diffusion of $CO_2$ into the concrete and MOF. Thus, the level of increase in $CO_2$ uptake at elevated pressure is higher in concrete mixes incorporating the MOF. The cement $CO_2$ uptake increased by 17 and 64% when MOF-incorporating mixes were carbonated at pressures of 1 and 5 bars, respectively.

In accordance with an embodiment of the present invention, the four concrete mixes C2 (4a+4c-1P-0M), C1 (20a+4c-1P-0M), M2 (4a+4c-1P-6M), and M1-2 (20a+4c-1P-6M) are carbonated under a constant pressure of 1 bar and for a duration of 4 hours. In particular, when the initial curing duration is extended from 4 to 20 hours the concrete mixes without MOF (i.e., 4a+4c-1P-0M and 20a+4c-1P-0M) has 51, 72, and 19% increase in compressive strength on day 1, 7, and 28 and 65% increase in $CO_2$ uptake. Further, when the initial curing duration is extended from 4 to 20 hours the concrete mixes incorporating MOF (i.e., 4a+4c-1P-6M and 20a+4c-1P-6M) has 125, 118, and 17% increase in the compressive strength on day at 1, 7, and 28 and 75% increase in the $CO_2$ uptake. Further, the strength is seen to increase by the least percentage (17%) on day 28 due to the water loss during the initial curing and carbonation phases. The water is not compensated for in sealed air curing hindering the subsequent hydration reaction and reduces the degree of hydration and compressive strength. In an alternate embodiment, the strength may be improved by spraying water after carbonation to facilitate the formation of hydration products to improve the compressive strength. The compressive strength increased from 39.9 to 43.1 MPa on day 28 representing an increase of 8%.

In accordance with an embodiment of the present invention, mixes C1 (20a+4c-1P-0M), C3 (20a+20c-1P-0M), M1-2 (20a+4c-1P-6M), and M3 (20a+20c-1P-6M) are cured for 20 hours of initial curing followed by carbonation at a pressure of 1 bar. The concrete mixes made without MOF exhibited insignificant increases (<3%) in compressive strength on day 7 and 28 with an increase of 108% in the $CO_2$ uptake. The concrete mixes incorporate MOF (20a+4c-1P-6M and 20a+20c-1P-6M) the compressive strengths are enhanced by 28% and 18% on day 7 and 28. Prolonging carbonation curing leads to higher $CO_2$ uptake, forming more carbonation products occupying the microstructure, decrease in porosity, and enhances the compressive strength. As a result, the concrete mix M3 (20a+20c-1P-6M) has the highest compressive strength of 45.6 MPa. In an alternate embodiment, M4 (20a+4c-5P-6M) has the highest strength for a 24-hour industrial time frame.

In accordance with an embodiment of the present invention, increasing the carbonation pressure from 1 to 5 bars causes a limited change in the compressive strengths of concrete mixes made without MOF and a limited increase in the carbon uptake.

The water absorption of mixes made with 0, 3, 6, and 9% MOF are 4.92, 5.22, 5.15, and 5.28%, respectively, while the corresponding permeable voids are 14.37, 14.97, 14.88, and 15.00%. These results are well-aligned with the compressive strength, whereby the addition of MOF causes a decrease in strength, with 6% MOF being superior to 3 and 9%. Apparently, adding MOF to concrete may create more voids, resulting in higher water absorption and lower compressive strength. However, these voids may have facilitated the diffusion of $CO_2$ into the MOF-incorporating concrete and promoted higher $CO_2$ uptake by the cement. Extending initial curing duration from 4 to 20 hours for mixes without MOF reduces the water absorption and voids by 14 and 12%, respectively. Conversely, mixes with MOF experience respective decreases of 9 and 5%. These results provide evidence of the densification of the concrete structure due to carbonation curing, thereby explaining the increase in 28-day compressive strength. Extending the carbonation curing period from 4 to 20 hours led to a reduction in the water absorption and permeable pore voids volume. In fact, respective properties decreased by 8 and 17% for mixes without MOF and 17 and 23% for counterparts made with MOFs, indicating that the extent of improvement in the resistance to water absorption due to prolonged carbonation is greater upon the addition of MOF. Ultimately, mixes carbonated for longer durations and inclusive of MOF are characterized by higher carbonation degree, lower water absorption, denser matrix, and higher compressive strength.

Furthermore, using a higher pressure for the accelerated carbonation curing regime had a limited impact on the water absorption and permeable voids, as was the case with compressive strength, decreased the absorption and voids percentages for mix C4 and M4. Meanwhile, adding MOF to the concrete along with higher pressure carbonation curing causes a reduction in the water absorption and voids volume by 9 and 17%, respectively, attributed to a higher degree of carbonation. This produced concrete with slightly higher 28-day compressive strength. Moreover, spraying the concrete after carbonation reduces the water absorption and permeable voids by up to 2% and increases the strength by nearly 8%. This slight improvement in mechanical and physical properties is owed to the formation of more hydration products. Table 5 shows details pertaining to water absorption and permeable pore voids volume at 28 days.

TABLE 5

Water absorption and permeable pore voids volume at 28 days

| Mix ID | Mix Designation | Water Absorption (%) | Permeable Pore Voids Volume (%) |
| --- | --- | --- | --- |
| C0 | 0a+0c-0P-0M | 5.27 ± 0.42 | 13.89 ± 1.23 |
| C1 | 20a+4c-1P-0M | 4.92 ± 0.41 | 14.37 ± 1.11 |
| M1-1 | 20a+4c-1P-3M | 5.22 ± 0.39 | 14.97 ± 1.41 |
| M1-2 | 20a+4c-1P-6M | 5.15 ± 0.35 | 14.88 ± 1.38 |
| M1-3 | 20a+4c-1P-9M | 5.28 ± 0.42 | 15.00 ± 1.39 |
| C2 | 4a+4c-1P-0M | 5.75 ± 0.41 | 16.39 ± 1.41 |
| M2 | 4a+4c-1P-6M | 5.67 ± 0.55 | 15.69 ± 1.40 |
| C3 | 20a+20c-1P-0M | 4.55 ± 0.40 | 11.99 ± 0.98 |
| M3 | 20a+20c-1P-6M | 4.28 ± 0.41 | 11.46 ± 0.85 |
| C4 | 20a+4c-5P-0M | 4.86 ± 0.41 | 14.69 ± 1.10 |
| M4 | 20a+4c-5P-6M | 4.71 ± 0.50 | 12.43 ± 1.05 |

Figure 6:
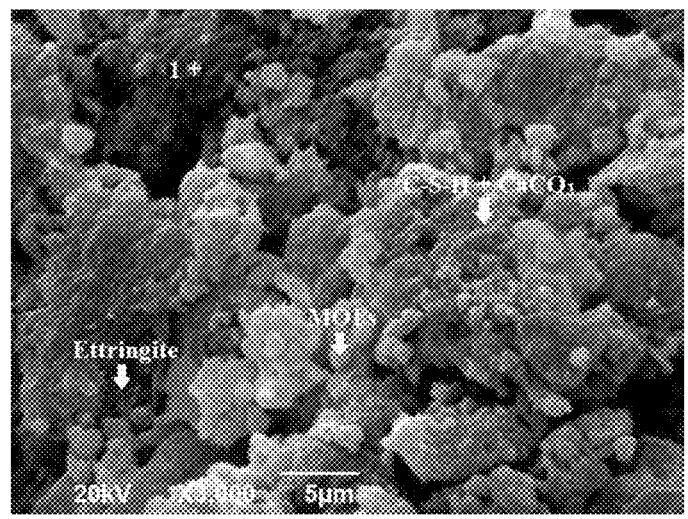
FIG. 6 is a pictorial snapshot illustrating microstructure of the metal-organic framework (MOF) incorporated cement-based concrete in accordance with an embodiment of the present invention.

FIG. 6 is a pictorial snapshot illustrating microstructure of the metal-organic framework (MOF) incorporated cement-based concrete in accordance with an embodiment of the present invention. In particular, the microstructure of MOF-incorporating carbonated concrete is characterized using a scanning electron microscope (SEM) to assure the presence of MOF particles in 1-day samples after the carbonation process. Moreover, the microstructure of M1-2 (20a+4c-1P-6M) is depicted in FIG. 6. The metal-organic framework (MOF) particles are spread across the microstructure as thin and disk-like structures with an average particle size of 1 μm. Further, the particles of MOF in MOF-incorporating cement-based concrete are detected across the microstructure after the accelerated carbonation curing process.

Figure 7:
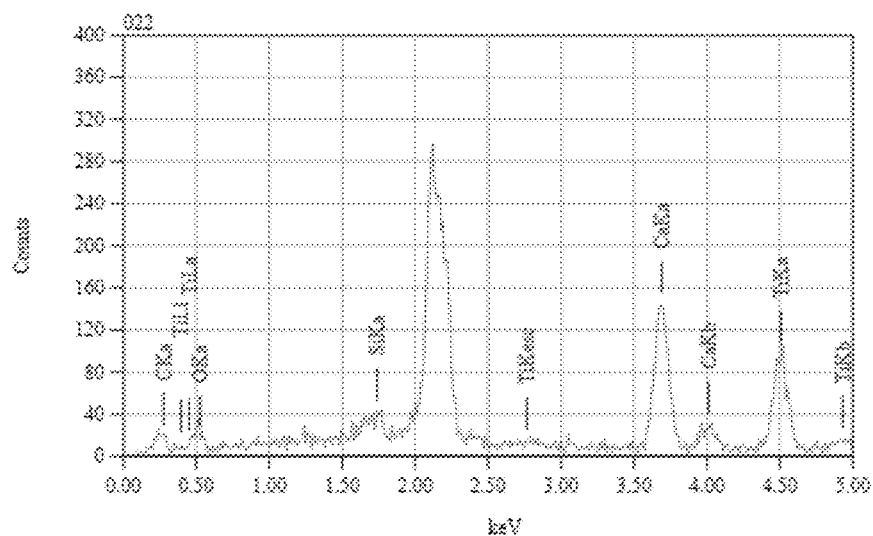
FIG. 7 illustrates EDX analysis of metal-organic framework (MOF) in mix M1-2 in accordance with an embodiment of the present invention.
Figure 8A:
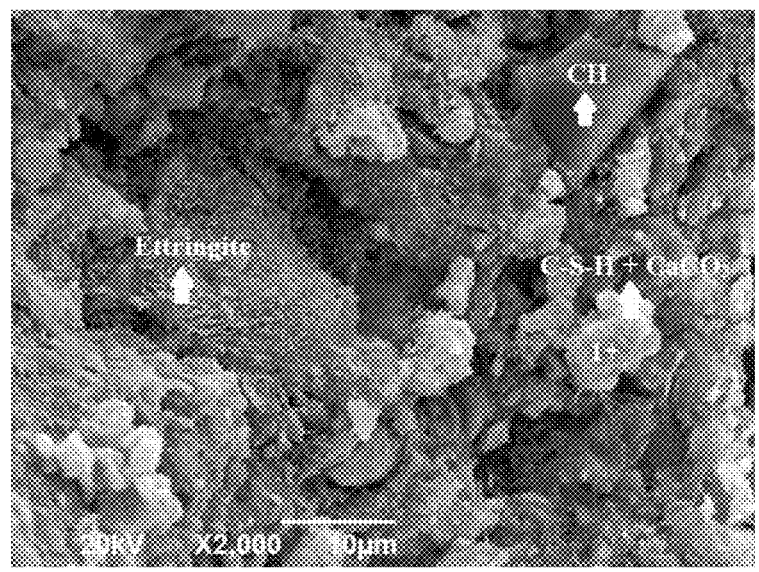
FIGS. 8A and 8B illustrate SEM and EDX analysis of 1-day mix C1 respectively in accordance with an embodiment of the present invention.
Figure 8B:
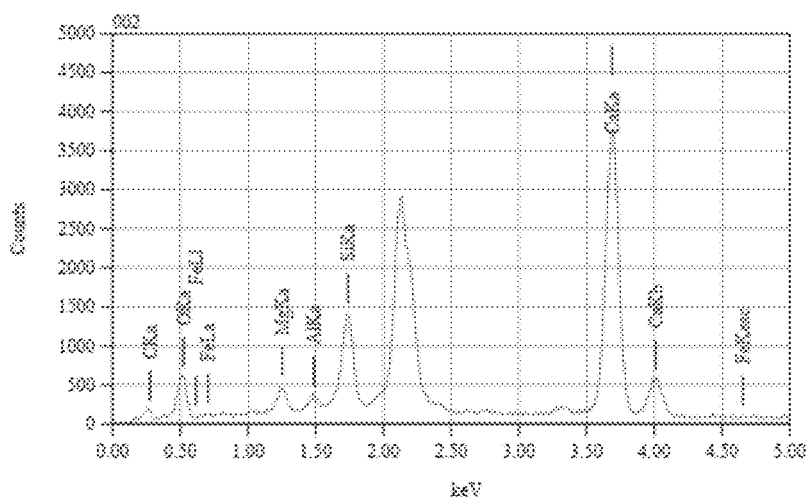

In an embodiment, the SEM images are captured using a JEOL-JSM 6390A microscope, coupled with energy-dispersive X-ray (EDX) after conducting the compressive strength test. FIG. 7 illustrates EDX analysis of metal-organic framework (MOF) in mix M1-2 in accordance with an embodiment of the present invention. The EDX spectrum confirms the presence of titanium as main elements of MOF. FIGS. 8A and 8B illustrate SEM and EDX analysis of 1-day mix C1 in accordance with an embodiment of the present invention. The analysis shows an intermix of C—S—H and $CaCO_3$. Further, the intermix was more frequently noticed throughout the microstructure of mix M1-2, albeit having a similarly dense structure.

Advantageously, the MOF-incorporated cement-based concrete is more sustainable and eco-friendly concrete which can be used in construction applications to mitigate the industry-related $CO_2$ emissions. Moreover, the MOF-incorporated cement-based concrete has higher carbon sequestration capacity, superior durability performance and superior mechanical properties compared to mixes made without MOF. Additionally, the MOF-incorporated cement-based concrete reduces the detrimental impact of $CO_2$ emissions on the environment. The MOF incorporated in cement-based concrete enhances the carbonation reaction efficiency of the cement binder.

In view of the foregoing, it will now be appreciated that the elements of the block diagram and flowcharts support combinations of means for carrying out the specified functions and processes, combinations of steps for performing the specified functions and processes, program instruction means for performing the specified functions and processes, and so on. The functions, systems and methods herein described could be utilized and presented in a multitude of languages. Individual systems may be presented in one or more languages and the language may be changed with ease at any point in the process or method described above. One of ordinary skills in the art would be to appreciate that there are numerous languages the system could be provided in, and embodiments of the present disclosure are contemplated for use with any language. The invention is capable of myriad modifications in various obvious aspects, all without departing from the spirit and scope of the present disclosure. Accordingly, the drawings and descriptions are to be regarded as illustrative in nature and not restrictive.

The features described herein may be combined to form additional embodiments and sub-elements of certain embodiments may form yet further embodiments. The foregoing summary of the present disclosure with the preferred embodiment should not be construed to limit the scope of the invention. It should be understood and obvious to one skilled in the art that the embodiments of the invention thus described may be further modified without departing from the spirit and scope of the invention.

It is well understood by a person skilled in the art that the outcomes of the method/process are not limited to the specific concrete mixture constituents and proportions.

Changing the mix design may cause a variation in the porosity of the concrete, which influences the diffusivity of the $CO_2$ gas, hence the $CO_2$ uptake. Other materials may be added to the concrete mixture, such as supplementary cementitious materials (SCMs), exhibit different effects on the $CO_2$ uptake potential and concrete performance. Incorporating another type of MOF with different $CO_2$ adsorption capacity may cause a variation in the $CO_2$ sequestration capacity. The curing conditions and curing temperature may vary in different embodiments depending on concrete mixes.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the invention, defined in scope by the following claims.

The invention claimed is:

1. A method of producing metal-organic framework (MOF) incorporated concrete to capture $CO_2$ and reduce carbon footprint, the method comprising the steps of:
   mixing cement, a plurality of fine aggregates, and a plurality of coarse aggregates for a predefined time under ambient conditions in a concrete mixer to form a dry cement-based concrete mix;
   mixing water in the dry cement-based concrete mix to form a wet cement-based concrete mix;
   incorporating $NH_2$-MIL-125(Ti) metal-organic framework (MOF) into the wet cement-based concrete and, subsequently exposing the $NH_2$-MIL-125(Ti) MOF incorporated cement-based concrete to accelerated carbonation curing,
   wherein the ambient conditions comprise 50±5% relative humidity (RH) and a temperature of 25±2° C.

2. The method of claim 1, wherein the cement is an ASTM Type I ordinary Portland cement (OPC).

3. The method of claim 1, wherein the pre-defined time comprises a total mixing time of up to 7 minutes.

4. The method of claim 1, wherein the plurality of fine aggregates and the plurality of coarse aggregates are dolomitic limestone aggregates.

5. The method of claim 1, further comprising the steps of:
   mixing the $NH_2$-MIL-125(Ti) metal-organic framework (MOF) incorporated cement-based concrete for two minutes and casting the $NH_2$-MIL-125(Ti) metal-organic framework (MOF) incorporated cement-based concrete by placing the metal-organic framework (MOF) incorporated cement-based concrete into a mold; and
   curing the $NH_2$-MIL-125(Ti) metal-organic framework (MOF) incorporated cement-based concrete via a three-stage curing process, the three-stage curing process comprising a pre-carbonation curing stage, the accelerated carbonation curing stage, and a post-carbonation curing stage.

6. The method of claim 5, wherein the accelerated carbonation curing stage depends on a plurality of factors comprising quantity of MOF, initial air curing duration, accelerated carbonation curing duration, and carbonation pressure.

7. The method of claim 5, wherein a degree of carbonation in the cement increases with the incorporation of metal-organic framework (MOF) in concrete.

8. The method of claim 5, wherein a degree of carbonation in the metal-organic framework (MOF) incorporated concrete increases with prolonged initial curing and accelerated carbonation curing durations and higher carbonation pressure.

9. The method of claim 5, wherein the compressive strength in the metal-organic framework (MOF) incorporated concrete increases with MOF inclusion, prolonged initial curing and accelerated carbonation curing durations, and carbonation pressure.

10. The method of claim 5, wherein the water absorption and permeable pore voids volume in the metal-organic framework (MOF) incorporated concrete decreases with prolonged initial curing and accelerated carbonation curing durations, and carbonation pressure.

11. The method of claim 1, wherein the metal-organic framework (MOF) has a $CO_2$ adsorption capacity of 125 mg/g.

12. The method of claim 1, wherein the metal-organic framework (MOF) has a high Brunauer, Emmett and Teller (BET) surface area of 1530 m$^2$/g.

13. The method of claim 1, wherein a quantity of the metal-organic framework (MOF) in concrete is 3, 6, and/or 9% by cement mass.

14. The method of claim 1, wherein the metal-organic framework (MOF) incorporation is optimized to increase the degree of carbonation of concrete, represented by the $CO_2$ uptake and carbonation depth.

* * * * *